April 17, 1962 W. H. VAN DEBERG 3,029,629
AIR GAGING CIRCUIT WITH TWO REGULATORS
Filed June 25, 1958 2 Sheets-Sheet 1

INVENTOR.
WALTER H. VAN DEBERG
BY
Ralph L. Tweedale
ATTORNEY

INVENTOR.
WALTER H. VAN DEBERG
BY
Ralph L. Tweedale
ATTORNEY

United States Patent Office 3,029,629
Patented Apr. 17, 1962

3,029,629
AIR GAGING CIRCUIT WITH TWO REGULATORS
Walter H. Van Deberg, Ferndale, Mich., assignor to The Thompson Company, Ferndale, Mich., a co-partnership
Filed June 25, 1958, Ser. No. 744,418
11 Claims. (Cl. 73—37.5)

This invention relates to air operated gaging devices such as are adapted for indicating or responding to changes in a characteristic which it is desired to measure or detect. Devices of this character are frequently used for dimensional calipering of production parts with a high degree of precision. In these devices, the calipering means is such that an orifice is varied in accordance with the dimension being calipered, and the changes in orifice size are reflected in the flow rate and the pressure conditions existing in an air duct feeding the orifice.

It has hitherto been proposed to use a mercury tube manometer provided with contact electrodes in its walls for the purpose of responding to the pressure changes induced in the flow duct by changes in the gaging orifice, but such devices have not heretofore found commercial acceptance. With the increasing use of automatic gaging equipment which can operate sorting, feeding or other controlled apparatus, the problem of quickly and reliably translating a tiny increment of air pressure into a power pulse great enough to actuate such apparatus has heretofore required the introduction of complex electronic amplifiers and other expensive apparatus requiring highly trained technicians to maintain in service. Prior to the present invention, the use of mercury manometers, whether for indicating or for circuit controlling use has not been feasible for gaging work to close tolerances at high production rates.

It is an object of the present invention to provide an improved air gaging device which avoids these difficulties and which is capable of detecting size differences as small as twenty millionths of an inch upon successive parts presented at intervals as small as one second or less.

These and other objects are achieved in accordance with the present invention by the use of a single flow path in which pressure readings are taken, as distinguished from the conventional Wheatstone bridge circuit having two flow paths, the pressures in each of which are differentially compared to produce a size reading or response. The present invention furthermore provides for a stabilizing or dampening action and, in addition, permits the use of higher pressure in the flow duct. These advantages are achieved by the addition of a pressure regulating valve of the supply-and-exhaust type for maintaining a constant air pressure on what would otherwise be the open end of the manometer, or the counter pressure connection of a differential pressure reader. The invention further contemplates in its preferred form the use of an inlet pressure reducing valve having characteristics matched to those of the constant pressure regulating valve and which is connected to supply the flow duct which leads to the gaging orifice from the same source of compressed air which supplies the pressure regulating valve.

Further objects and advantages of the present invention will be apparent from the following description, reference being had to the accompanying drawings wherein a preferred form of the present invention is illustrated.

Figure 5:
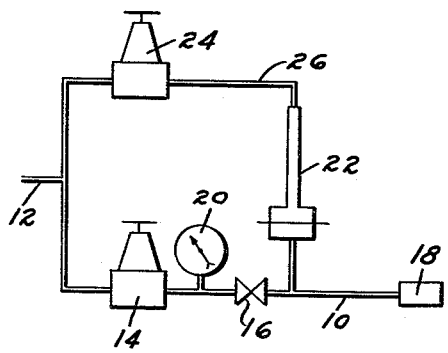
FIG. 5 is a circuit diagram of the complete air gaging device.

The form of the present invention illustrated in the drawings comprises a flow duct 10, FIG. 5, which is fed from a suitable source of compressed air 12 through a constant pressure reducing valve 14 and a fixed orifice 16 which may, if desired, be adjustable or replaceable for calibrating purposes. The duct 10 has an exit provided by a variable gage orifice 18 which may take the form of a standard air calipering plug, ring, or other type head and which is adapted to form a variable exhaust orifice the size of which depends upon the size or other characteristic being gaged. A conventional pressure gage 20 may be supplied for indicating the outlet pressure from the reducing valve 14.

The mercury manometer 22 has one leg connected to respond to pressure in the flow duct 10. Also connected with the compressed air supply 12 is a pressure regulator valve 24 which is of the three-way or supply-and-exhaust type. The regulated pressure port of the regulator 24 connects by a duct 26 with the opposite leg of the manometer 22. This is a dead end connection and during stable conditions, there is no flow either way in the conduit 26.

Figure 1:
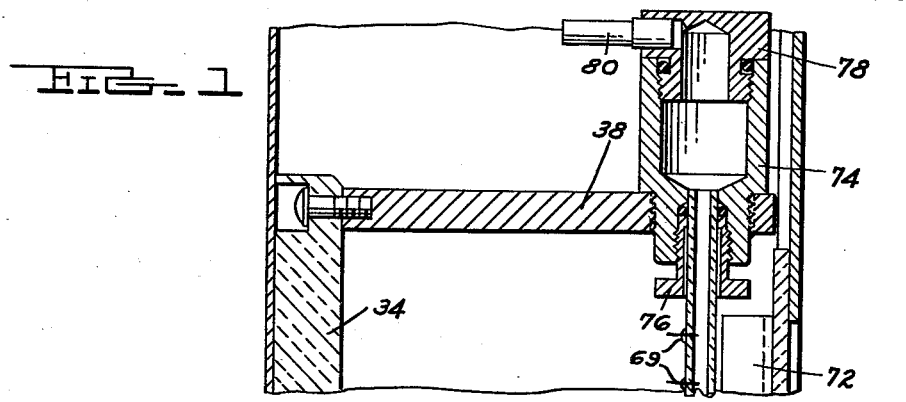
FIG. 1 is a vertical sectional view partly broken away showing a preferred form of manometer construction forming part of the present invention.
Figure 2:
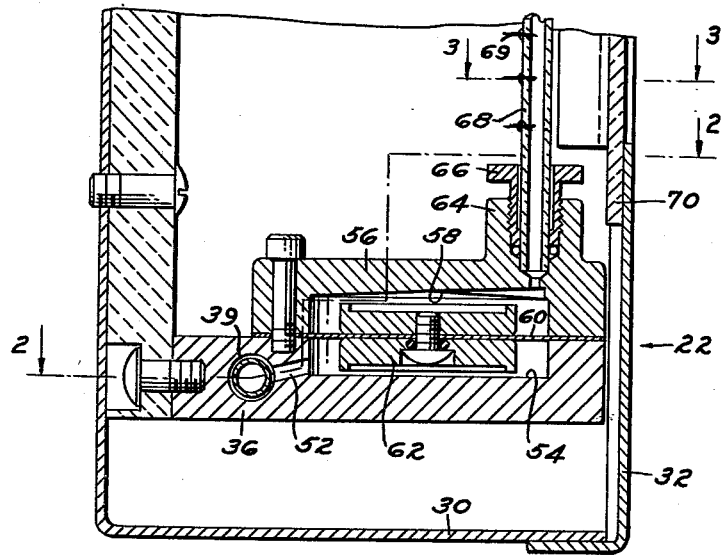
FIG. 2 is a sectional view taken on line 2—2 of FIG. 1.
Figure 2:
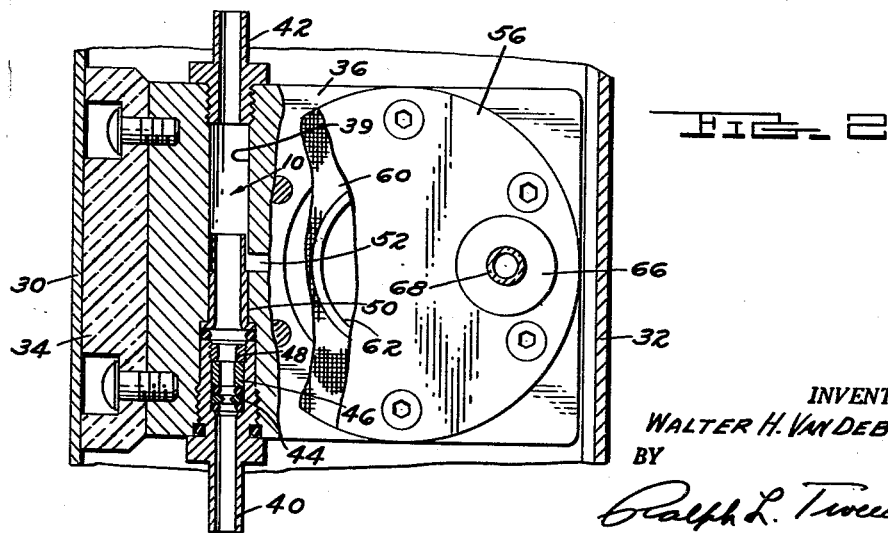
Figure 3:
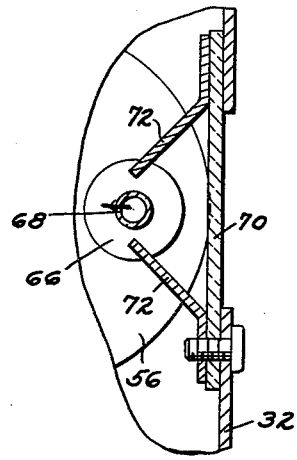
FIG. 3 is a fragmentary sectional view on line 3—3 of FIG. 1.

The particular form of manometer illustrated in FIGS. 1, 2 and 3 may comprise a rectangular sheet metal box 30 having a cover 32. Secured to the rear wall of the box 30, is an insulated block 34 which supports a lower base block 36 and an upper bracket 38. The base block 36 may have formed in it the flow duct 10 and the lower part of the manometer.

For this purpose the block 36 has a transverse bore 39 having hose fittings 40 and 42 at its opposite ends by which the duct 10 may be connected into the circuit of FIG. 5. The fitting 40 is adapted to form a mounting for a fixed orifice plate 44 which may form the orifice 16 in FIG. 5. The plate 44 is positioned by means of O ring seals, a spacer tube 46 and a threaded retainer ring 48.

Mounted in the bore 39 above the fitting 40 and sealed by the means of an O ring is a tubular shroud or ferrule 50 which has a very small clearance, shown exaggerated, with the walls of bore 39. The shroud 50 extends upwardly beyond the intersection of a cross bore 52, which forms the connection between duct 10 and the lower leg of manometer 22. Cross bore 52 leads to a cylindrical chamber 54 formed in the top surface of the block 36.

A housing member 56 has a corresponding chamber 58 facing the chamber 54 and is mounted on the top face of block 36 with a diaphragm 60 of impervious membrane or sheet forming a flexible wall separating the chambers 54 and 58. A central stop button assembly 62 serves to limit the stroke of the diaphragm 60 in both directions.

The cover member 56 has a boss 64 in which is mounted by means of a gland nut 66, a glass tube 68, the lower end of which is in open communication with the chamber 58. The tube 68 may serve as a mercury column either for sight gaging purposes or for establishing electric circuits by means of a series of spaced electrodes 69 sealed in the walls of the glass tube in the well-known manner.

The cover 32 may be provided with a window glass 70 and shield wings 72 paralleling the tube. The upper bracket 38 supports an overflow pot 74 having a gland nut 76 which receives the upper end of the tube 68. A cap 78 closes the top of the overflow pot 74 and has a tube fitting 80 forming a connection to the duct 26.

Figure 4:
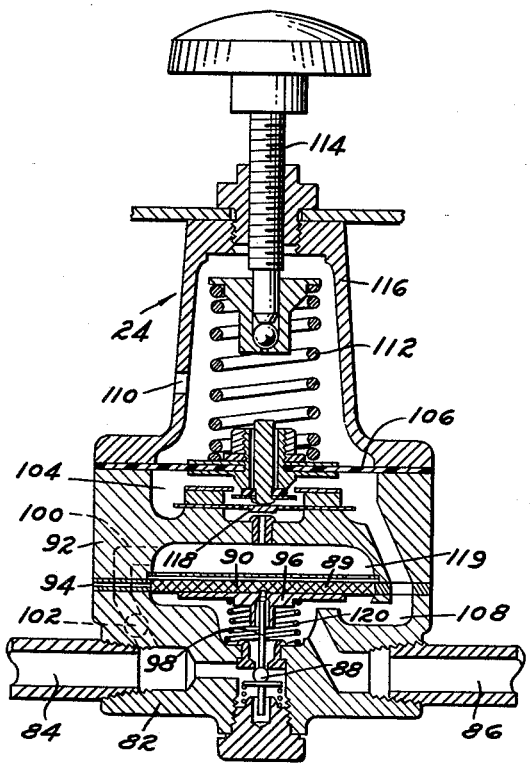
FIG. 4 is a sectional view through a regulating valve forming part of the present invention.

The regulator valve shown in FIG. 4 may be of any well-known precision type having supply-and-exhaust functions. The one illustrated comprises a main body 82 having an inlet connection 84 which connects with the air supply 12 and a regulated air connection 86 which connects with the duct 26. A supply or inlet valve is formed at 88 and is normally spring closed upwardly. An operating diaphragm 89 having an internal air chamber 90 (e.g. as in Moore 2,501,957) is clamped to the body 82 by means of an intermediate body member 92. The internal air chamber 90 is connected to atmosphere through radial exhaust ports 94.

The lower wall of diaphragm 89 is provided with an exhaust valve seat and flange 96 which, in the stable position of the valve, normally rests upon the stem 98 of the valve 88 and closes the exhaust path through the hollow diaphragm chamber 90, without, however, opening the supply valve 88.

A pilot pressure duct 100 having a removable restriction plug 102 therein leads to a pilot diaphragm chamber 104 which is closed by a control diaphragm 106, the lower face of which is exposed to the pressure in the regulated air duct 86 through a pressure feedback passage 108. This pressure is opposed by atmospheric pressure coming through a vent hole 110 and by a spring 112 which is adjustable by means of a threaded control stem 114 mounted in the spring housing 116, which also serves to clamp the diaphragm 106 to the auxiliary body 92. The diaphragm 106 and spring 112 control a pilot exhaust valve 118 which regulates the rate of exhaust from the chamber 119 on the top face of diaphragm 89. A spring 120 biases the diaphragm 89 upwardly and serves to require for equilibrium a constant differential or preponderance of pilot pressure on top of diaphragm 89 as compared with the regulated pressure below it.

The operation of the regulator shown in FIG. 4 is well understood and utilizes the feed-back of regulated pressure in duct 86 through duct 108 to operate diaphragm 106 and pilot valve 118 in a manner tending to create a constant pressure in the duct 86. If the pressure therein tends to rise, valve 118 is opened, reducing the pressure on top of diaphragm 89 and raising the exhaust valve seat 96. If the pressure in regulated duct 86 tends to fall, the opposite action occurs and supply valve 88 is opened.

The regulator 14 may be constructed as a duplicate of the regulator 24, and inasmuch as the variable orifice 18, in most applications, is continuously open to some extent at least, the exhaust seat 96 never opens, and so the valve functions as a pilot operated pressure reducing valve. If desired, the flange 96 may be imperforate so that no air may leave the valve except by passage 86.

In operation of the complete gaging system it will be seen that the pressure reducing valve 14 serves to maintain a constant inlet pressure up-stream of the fixed orifice 16, depending upon the setting of the spring in the reducing valve. A continuous flow occurs through duct 10 with pressure dropping to atmosphere in two steps at orifices 16 and 18, respectively. Parts to be gaged may be successively placed in co-operative relation with the gaging orifice or head 18, and for each value of the characteristic being gaged, a certain orifice size will produce a definite pressure value in the continuous flow duct 10.

This pressure is transmitted through the cross bore 52, which is shielded from turbulence in duct 10 by shroud 50. The instantaneous means pressure in duct 10 is thus transmitted to the lower side of diaphragm 60 through which it is transmitted to the mercury column above diaphragm 60 and in the glass tube 68. The weight of the mercury column, plus the additional constant pressure maintained in duct 26 by the regulator 24, will exactly counter-balance this pressure at a certain pre-determined height of mercury. This may be either read visually or utilized to establish any electric circuit for controlling sorting, or other mechanisms, in accordance with the characteristic being gaged.

When the successive parts are being gaged rapidly one after another, the column of mercury will rise and fall from one reading to the next, and small volumetric increments of air have to be admitted to, or exhausted from, the constant pressure duct 26. The action of the precision regulator 24 in quickly admitting or exhausting air to or from the duct 26 as required, not only speeds up the response of the manometer, but also produces a damping action upon the moving column of mercury which has been found to be very beneficial in reducing fluctuations, or over-travel, in the mercury column during transient conditions.

The use of the constant pressure connection 26 on the top of the mercury column serves another purpose as well, in that it enables a higher pressure level to be maintained in the duct 10 without requiring a long column of mercury to counter-balance it. This reduces the momentum of the moving mercury column and further serves to decrease transient fluctuations. It will thus be seen that the present invention provides an improved air gaging system which is well adapted to precision measurements at high speeds.

While the form of embodiment of the invention as herein disclosed constitutes a preferred form, it is to be understood that other forms might be adopted, all coming within the scope of the claims which follow:

I claim:
1. An air gaging system comprising in combination with a source of air pressure, means forming a gaging orifice variable in size in accordance with a value to be gaged, a pressure regulating valve connected to supply air from the source to the gaging orifice, a differential pressure responsive translating device having one side connected to a point between the regulating valve and the gaging orifice, and a pressure regulator of the feed- and-bleed type connected directly between the source and the other side of the translating device whereby the translating device is stabilized in responding to transient pressure changes at the gaging orifice.

2. An air gaging system comprising in combination with a source of air pressure, means forming a gaging orifice variable in size in accordance with a value to be gaged, a pressure regulating valve connected to supply air from the source to the gaging orifice, a differential pressure responsive translating device having one side connected to a point between the regulating valve and the gaging orifice, and a pressure regulating valve connected directly between the source and the other side of the translating device, both pressure regulating valves comprising an outlet pressure responsive valve mechanism of the supply-and-exhaust type whereby the translating device is stabilized in responding to transient pressure changes at the gaging orifice.

3. An air gaging system comprising in combination with a source of air pressure, a gaging head adapted to provide a variable orifice, a first air duct from the source to the gaging head and having a self adjusting, constant outlet pressure reducing valve therein, a fixed orifice beyond the reducing valve and ahead of the gaging head, a mercury manometer having one leg connected to the first duct between the gaging head and the fixed orifice, and a second duct maintaining a constant air pressure on the other leg of the manometer including a supply-and-exhaust type regulator connected to the source.

4. A stabilized, single circuit air gaging system comprising a source of air under pressure, a single continuous flow path having a pressure reducing valve, a fixed orifice and a variable gaging orifice in series between the source and a point of low pressure, a pressure sensing device connected to said path at a location between the fixed and the variable orifices, and means for applying to the sensing device an independently regulated air pressure in opposition to the pressure being sensed in the flow path.

5. A stabilized, single circuit air gaging system comprising a source of air under pressure, a single continuous flow path having a pressure reducing valve, a fixed orifice and a variable gaging orifice in series between the source and a point of low pressure, a pressure sensing device connected to said path at a location between the fixed and the variable orifices, and means including a reducing valve of the supply-and-exhaust type for applying to the sensing device a regulated air pressure in opposition to the pressure being sensed in the flow path.

6. In combination a flow measuring duct, a mercury manometer having one leg connected to respond to pressure changes in the duct, means for establishing an inflow of air to the duct at a rate which is predetermined for every value of pressure in the duct, means for passing air out of the duct at a rate varying with a variable characteristic to be gaged, a second duct connected to the other leg of the manometer, and means for maintaining a constant pressure value in the last-named duct independently of flow variations in the first duct.

7. In combination a flow measuring duct, a mercury manometer having one leg connected to respond to pressure changes in the duct, means including a constant pressure reducing valve for establishing an inflow of air to the duct at a rate which is predetermined for every value of pressure in the duct, means for passing air out of the duct at a rate varying with a variable characteristic to be gaged, a second duct connected to the other leg of the manometer, and means including a constant pressure, three-way regulating valve for maintaining a constant pressure value in the last-named duct.

8. In combination a flow measuring duct, a mercury manometer having one leg connected to respond to pressure changes in the duct, means for establishing an inflow of air to the duct at a rate which is predetermined for every value of pressure in the duct, means for passing air out of the duct at a rate varying with a variable characteristic to be gaged, a second duct connected to the other leg of the manometer, means for maintaining a constant pressure value in the last-named duct and means forming a movable-walled chamber having a limited fluid displacement forming the manometer terminus of one of said ducts.

9. An air gaging system comprising in combination with a source of air pressure, a gaging head adapted to provide a variable orifice, a first air duct from the source to the gaging head and having a self adjusting, constant outlet pressure reducing valve therein, a fixed orifice beyond the reducing valve and ahead of the gaging head, a mercury manometer having one leg connected to the first duct between the gaging head and the fixed orifice, a second duct maintaining a constant air pressure on the other leg of the manometer including a supply-and-exhaust type regulator connected to the source and means forming a movable-walled chamber having a limited fluid displacement forming the manometer terminus of one of said ducts.

10. In combination a flow measuring duct, a mercury manometer having one leg connected to respond to pressure changes in the duct, means for establishing an inflow of air to the duct at a rate which is predetermined for every value of pressure in the duct, means for passing air out of the duct at a rate varying with a variable characteristic to be gaged, a second duct connected to the other leg of the manometer, and means for maintaining a constant pressure value in the last-named duct, said one leg of the manometer having communication with the first duct only at an annular zone adjacent the peripheral walls of the duct whereby the pressure fluctuations of turbulent flow in the duct are isolated from the manometer.

11. A stabilized, single circuit air gaging system comprising a source of air under pressure, a single continuous flow path having a pressure reducing valve, a fixed orifice and a variable gaging orifice in series between the source and a point of low pressure, a pressure sensing device connected to said path at a location between the fixed and the variable orifices, means for applying to the sensing device a regulated air pressure in opposition to the pressure being sensed in the flow path and means forming an annular junction at the periphery of said path through which the sensing device is connected whereby local turbulence in the path is isolated from the sensing device.

References Cited in the file of this patent

UNITED STATES PATENTS

| | | |
|---|---|---|
| 2,501,957 | Moore | Mar. 28, 1950 |
| 2,706,397 | Byrkett | Apr. 19, 1955 |
| 2,845,792 | Eisenhardt | Aug. 5, 1958 |
| 2,852,849 | Groener | Sept. 23, 1958 |

FOREIGN PATENTS

| | | |
|---|---|---|
| 291,543 | Switzerland | Sept. 16, 1953 |
| 773,239 | Great Britain | Apr. 24, 1957 |